(12) United States Patent
Niijima et al.

(10) Patent No.: US 11,900,793 B2
(45) Date of Patent: Feb. 13, 2024

(54) TEMPERATURE STIMULUS PRESENTATION DEVICE AND TEMPERATURE STIMULUS PRESENTATION METHOD

(71) Applicant: Nippon Telegraph and Telephone Corporation, Tokyo (JP)

(72) Inventors: Arinobu Niijima, Musashino (JP); Toki Takeda, Musashino (JP); Takafumi Mukouchi, Musashino (JP); Takashi Sato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/786,240

(22) PCT Filed: Dec. 17, 2019

(86) PCT No.: PCT/JP2019/049311
§ 371 (c)(1),
(2) Date: Jun. 16, 2022

(87) PCT Pub. No.: WO2021/124431
PCT Pub. Date: Jun. 24, 2021

(65) Prior Publication Data
US 2022/0375316 A1 Nov. 24, 2022

(51) Int. Cl.
*H04B 3/36* (2006.01)
*G08B 6/00* (2006.01)

(52) U.S. Cl.
CPC ................. *G08B 6/00* (2013.01)

(58) Field of Classification Search
CPC .................. G08B 6/00; G06F 3/016
See application file for complete search history.

(56) References Cited

U.S. PATENT DOCUMENTS

| | | | | |
|---|---|---|---|---|
| 7,610,919 | B2 * | 11/2009 | Utley | A24F 47/00 455/100 |
| 10,484,805 | B2 * | 11/2019 | Abolfathi | B33Y 80/00 |
| 2005/0263160 | A1 * | 12/2005 | Utley | A24F 47/00 131/270 |
| 2010/0209897 | A1 * | 8/2010 | Utley | A24F 47/00 434/238 |
| 2023/0054418 | A1 * | 2/2023 | Niijima | H04M 1/00 |

OTHER PUBLICATIONS

Li et al., "Sensor-embedded teeth for oral activity recognition," ISWC '13, Sep. 9, 2013, pp. 41-44.
Stevens et al., "Temperature sensitivity of the body surface over the life span," Somatosensory & Motor Research, 1998, 15(1):13-28.

* cited by examiner

Primary Examiner — Toan N Pham
(74) Attorney, Agent, or Firm — Fish & Richardson P.C.

(57) ABSTRACT

A thermal stimulus presentation device 1 for presenting a thermal stimulus in the mouth includes a presentation unit 13 that presents the thermal stimulus in the mouth, a receiving unit 11 that receives notification information for notifying a user, and a control unit 12 that controls the thermal stimulus of the presentation unit 13, upon the notification information being received, the presentation unit 13 presenting the thermal stimulus in the mouth in accordance with the control of the control unit 11.

13 Claims, 6 Drawing Sheets

TEMPERATURE STIMULUS PRESENTATION DEVICE AND TEMPERATURE STIMULUS PRESENTATION METHOD

CROSS-REFERENCE TO RELATED APPLICATIONS

This application is a National Stage application under 35 U.S.C. § 371 of International Application No. PCT/JP2019/049311, having an International Filing Date of Dec. 17, 2019, the disclosure of which is considered part of the disclosure of this application, and is incorporated in its entirety into this application.

TECHNICAL FIELD

The present invention relates to a thermal stimulus presentation device that presents thermal stimuli in the mouth and to a thermal stimulus presentation method.

BACKGROUND ART

In the case of presenting information in the mouth, visual display cannot be used since the information cannot be seen. It is thus conceivable to utilize tactile display. In the case of mounting a device in the mouth, it is conceivable to mount the device to teeth as described in NPL 1. NPL 2 states that a person's lips are sensitive to thermal stimuli.

CITATION LIST

Non Patent Literature

[NPL 1] Cheng-Yuan Li et al., "Sensor-embedded teeth for oral activity recognition" (2013)
[NPL 2] JOSEPH C. STEVENS and KENNETH K. CHOO, "Temperature sensitivity of the body surface over the life span" (1998)

SUMMARY OF THE INVENTION

Technical Problem

In the case of mounting a tactile actuator to teeth and presenting a tactile stimulus, the following problems arise. In the case where the tactile stimulus is a vibration stimulus, vibration sound is transmitted through bone conduction, and is thus troublesome for the user. In the case of an electrical stimulus, the nerves of the teeth are stimulated, causing pain to the user. In the case of an ultrasonic stimulus or a wind stimulus, a large device is required, and is thus difficult to mount in the mouth.

The present invention was made in view of the forgoing problems, and an object of the invention is to provide a thermal stimulus presentation device and a thermal stimulus presentation method capable of intraoral information presentation without stressing the user.

Means for Solving the Problem

A thermal stimulus presentation device according to one mode of the present invention includes a presentation unit configured to present a thermal stimulus in a mouth, a receiving unit configured to receive notification information for notifying a user, and a control unit configured to control the thermal stimulus of the presentation unit, upon the notification information being received, the presentation unit presenting the thermal stimulus in the mouth in accordance with the control of the control unit.

One mode of the present invention is a thermal stimulus presentation method that is performed by a thermal stimulus presentation device, the method including a receiving step of receiving notification information for notifying a user, a controlling step of controlling a thermal stimulus to be presented in a mouth, upon the notification information being received, and a presenting step of presenting the controlled thermal stimulus in the mouth.

Effects of the Invention

According to the present invention, a thermal stimulus presentation device and a thermal stimulus presentation method capable of intraoral information presentation without stressing the user can be provided.

DESCRIPTION OF EMBODIMENTS

Hereinafter, embodiments of the present invention will be described using the drawings.

In the present embodiment, a tactile display that uses thermal stimuli is realized in the mouth, based on the bodily characteristic of people's lips being sensitive to thermal stimuli (see NPL 2).

(Configuration of Thermal Stimulus Presentation Device)

Figure 1:
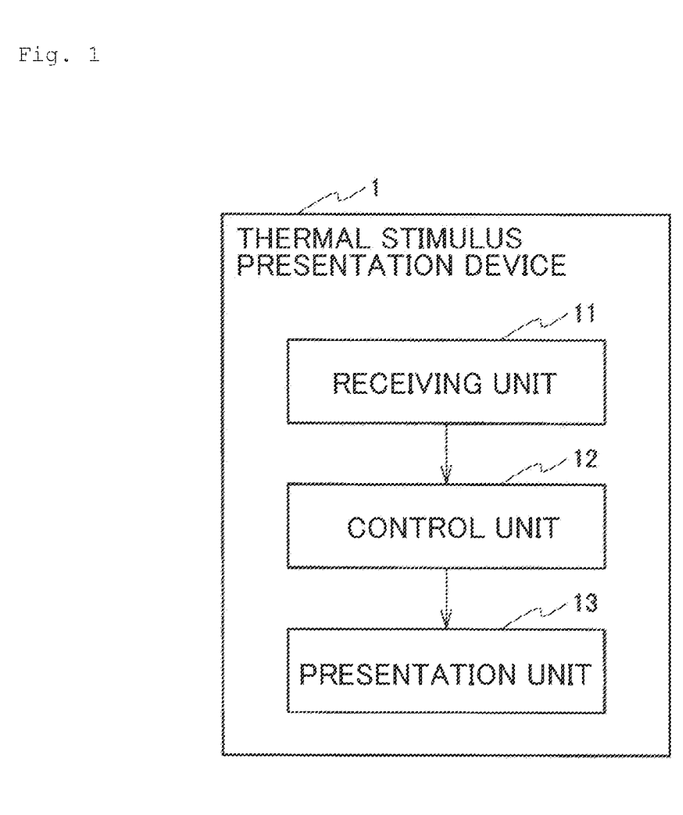
FIG. 1 is a block diagram showing a configuration of a thermal stimulus presentation device according to an embodiment of the present invention.

FIG. 1 is a block diagram showing the configuration of a thermal stimulus presentation device 1 in an embodiment of the present invention. The thermal stimulus presentation device 1 of the present embodiment is a device that presents a thermal stimulus in the mouth. The thermal stimulus presentation device 1 that is illustrated is provided with a receiving unit 11, a control unit 12, and a presentation unit 13. The receiving unit 11 receives notification information for notifying a user from an external device (not shown).

The control unit 12 controls the thermal stimulus of the presentation unit 13, upon the receiving unit 11 notifying the notification information. In the present embodiment, the control unit 12 applies an electrical current to the presentation unit 13. Also, in the case where the presentation unit 13 is provided with a plurality of thermoelectric elements, the control unit 12 may cause the plurality of thermoelectric elements to present the thermal stimulus sequentially to allow the user to perceive a direction.

The presentation unit 13 is a tactile actuator that provides a thermal stimulus in the mouth. The presentation unit 13 presents a cold stimulus or a warm stimulus as the thermal stimulus. The presentation unit 13 of the present embodiment is provided with at least one thermoelectric element.

Figure 2:
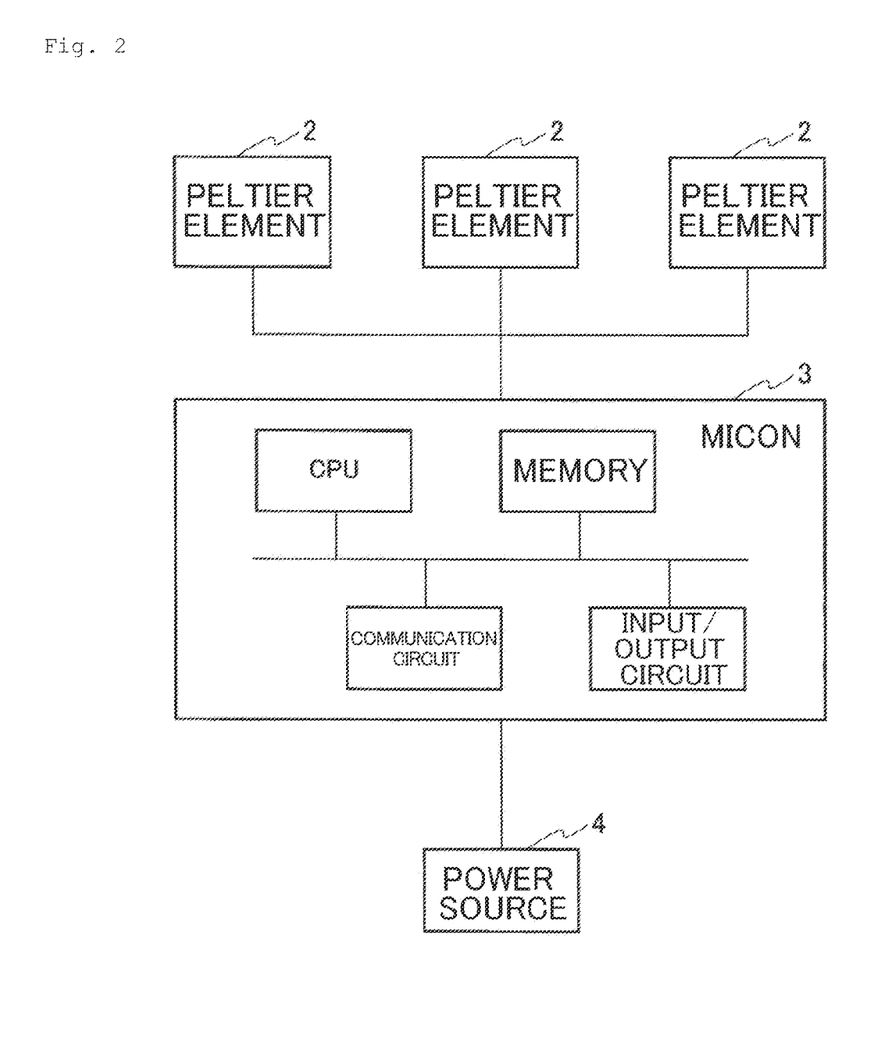
FIG. 2 is a hardware configuration diagram showing an implementation example of the thermal stimulus presentation device.

FIG. 2 is a hardware configuration diagram showing an implementation example of the thermal stimulus presentation device 1. The thermal stimulus presentation device 1 that is illustrated is provided with Peltier elements 2, a micon 3 (microcontroller), and a power source 4 as hardware.

The Peltier elements 2 function as the presentation unit 13 of FIG. 1. The Peltier elements 2 are one type of thermoelectric element (semiconductor thermoelectric element) that uses the Peltier effect. In the present embodiment, the Peltier elements 2 are used as the thermoelectric element, but other thermoelectric elements may be used to present a thermal stimulus.

Since the thermal stimulus is presented in the mouth, a small Peltier element 2 comparable in size to the brackets of dental braces is used here. For example, a single-element Peltier element 2 may be used in which the dimensions of the ceramic substrate are 3.5×3.35 mm and the dimensions of the copper plate of the p-n junction are 2.8×1.1 mm. In the present embodiment, a Peltier element 2 such as the above is mounted to teeth in the mouth so as to contact the back side of the lips.

Figure 3:
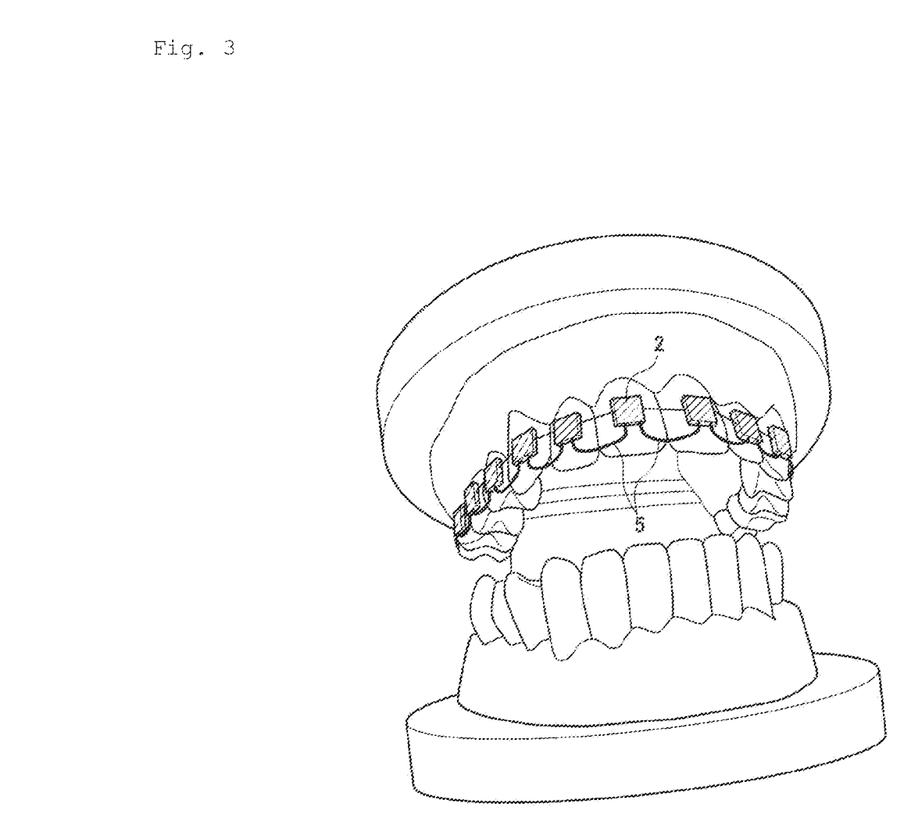
FIG. 3 is a conceptual diagram of a plurality of Peltier elements mounted to teeth.

FIG. 3 is a conceptual diagram of a plurality of Peltier elements 2 mounted to teeth. In the illustrated example, a presentation instrument provided with a plurality of Peltier elements 2 is mounted to teeth. In the presentation instrument, the plurality of Peltier elements 2 are connected in an array with wire or the like. The presentation instrument is similar in shape to dental braces, with the bracket portion of the braces being replaced with the Peltier elements 2. Due to mounting such a presentation instrument resembling the shape of braces to teeth, the user is able to comfortably wear the Peltier elements 2 even in daily life. Each Peltier element 2 is connected to the micon 3 via a lead 5.

In the illustrated example, the Peltier element 2 is mounted to a plurality of upper teeth, and the Peltier element 2 presents a thermal stimulus to the back side of the upper lip, but the present invention is not limited thereto. For example, the Peltier element 2 may be mounted to lower teeth, and present a thermal stimulus to the back side of the lower lip. Also, the Peltier element 2 may be mounted to both upper and lower teeth, and present a thermal stimulus to both the back side of the upper lip and the back side of the lower lip. Also, in the illustrated example, the Peltier element 2 is mounted to all the upper teeth, but the Peltier element 2 need only be mounted to at least one tooth.

Figure 4:
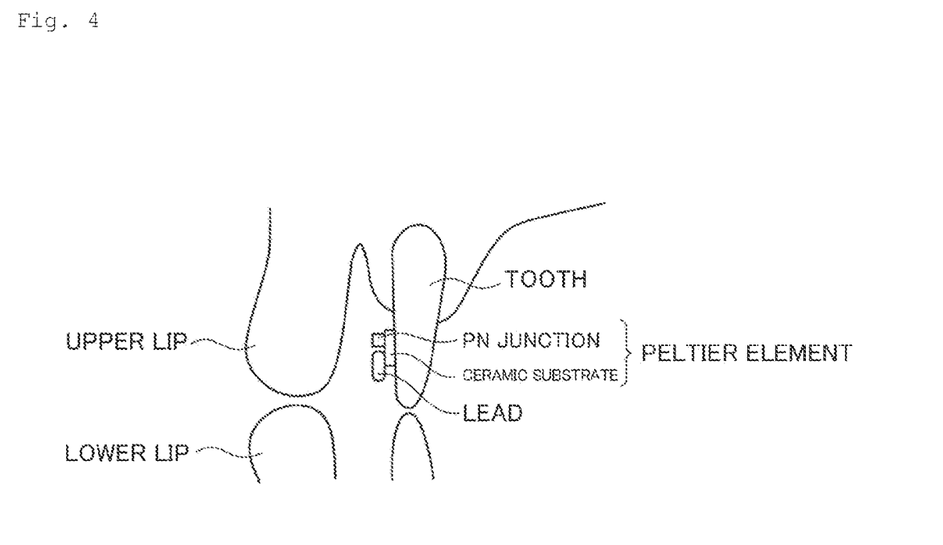
FIG. 4 is a schematic diagram schematically showing a cross-section of a mouth in which the Peltier elements are mounted to teeth.

FIG. 4 is a schematic diagram schematically showing a cross-section of a mouth in which the Peltier elements 2 are mounted to teeth. The Peltier elements 2 are mounted such that the ceramic substrate side contacts the teeth and the p-n junction (copper plate) side contacts the back side of the lip.

The micon 3 and the power source 4 may be mounted inside the mouth together with the Peltier elements 2, or may be mounted outside the mouth (carried by the user). In the case of being mounted inside the mouth, the micon 3 and the power source 4 may be mounted to a tooth together with one of the Peltier elements. In the case of mounting the micon 3 and the power source 4 outside the mouth, the lead 5 connecting the Peltier elements 2 and the micon 3 will come out of the mouth.

The micon 3 is a computer that includes a CPU, a memory, a communication circuit and an input/output circuit, and functions as the receiving unit 11 and the control unit 12. The micon 3 is connected to each Peltier element 2 by the lead 5 or the like. The micon 3 receives notification information that is transmitted from an external device (not shown). Upon the notification information being received, the micon 3 applies an electrical current to the Peltier elements 2, and causes the Peltier elements 2 to present a thermal stimulus. That is, the micon 3 controls the Peltier elements 2 to turn ON.

Due to the micon applying the electrical current to the Peltier elements 2, the temperature on the p-n junction side of the Peltier elements is changed, and a thermal stimulus can be presented to the back side of the lip. Also, by controlling the current value (direction of current, magnitude of current) that is applied to the Peltier elements 2, the micon 3 is able to select a cold stimulus or a warm stimulus as the thermal stimulus, and is also able to control the temperature (intensity of thermal stimulus) that is presented. The power source 4 supplies power to the micon 3.

(Operations of Thermal Stimulus Presentation Device)

Figure 5:
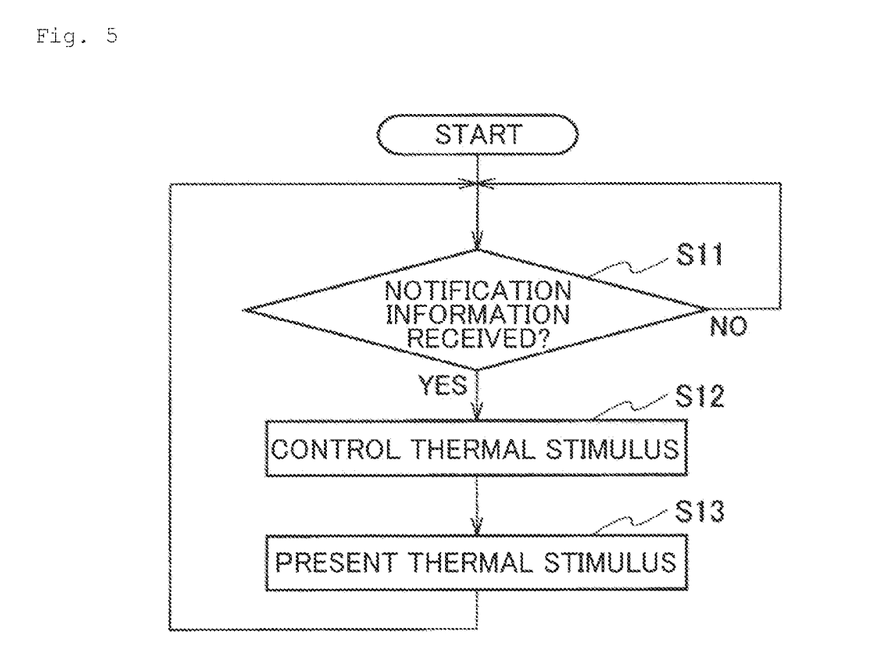
FIG. 5 is a flowchart showing operations by the thermal stimulus presentation device.

FIG. 5 is a flowchart showing operations by the thermal stimulus presentation device 1 of the present embodiment. Upon the receiving unit 11 receiving notification information for notifying the user from an external device (S11: YES), the control unit 12 controls the thermal stimulus of the presentation unit 13 (S12). Specifically, the control unit 12 applies an electrical current of a predetermined direction and magnitude to the Peltier element 2 (presentation unit 13).

The presentation unit 13 presents a thermal stimulus in the mouth, in accordance with the control of the control unit 12 (S13). Specifically, due to the electrical current being applied to the Peltier element 2, and the copper plate of the p-n junction cools down or heat up, and a thermal stimulus is thereby presented. In the case where the Peltier element 2 is mounted to the teeth, the copper plate of the p-n junction is in contact with the back side of the lip, and the lip is able to sense the heat or cold of the copper plate as a thermal stimulus.

In the case where the thermal stimulus presentation device 1 is provided with a plurality of Peltier elements 2, methods of presenting the thermal stimulus include a static presentation method and a dynamic presentation method. With the static presentation method, the control unit 12 applies an electrical current simultaneously to the plurality of Peltier elements 2. This heats or cools the copper plates of the plurality of Peltier elements 2 at the same time.

The static presentation method can be used when notifying the user that an e-mail has been received, for example. Specifically, if an e-mail is received, a smartphone (external device) transmits notification information for notifying the user that an e-mail has been received to the thermal stimulus presentation device 1. The notification information is a command or the like for turning ON the thermal stimulus, for example. The micon 3 of the thermal stimulus presentation device 1 is assumed to be wirelessly connected to the smartphone by BLE (Bluetooth Low Energy) pairing or the like. Upon the thermal stimulus presentation device 1 receiving the notification information, the plurality of Peltier elements 2 in the mouth cool down or heat up in unison. The user is thereby able to detect that the smartphone has received an e-mail.

With the dynamic presentation method, the control unit 12 applies an electrical current sequentially to each of the plurality of Peltier elements 2. The copper plates of the plurality of Peltier elements 2 thereby heat up or cool down sequentially. When navigating the user, for example, the dynamic presentation method can be used in the case of notifying the user of a direction. In the case of wanting to guide the user to the left, for example, the control unit 12 presents the thermal stimulus sequentially starting from the Peltier elements 2 mounted on the right side of the mouth and moving toward the Peltier elements 2 mounted on the left side.

Figure 6:
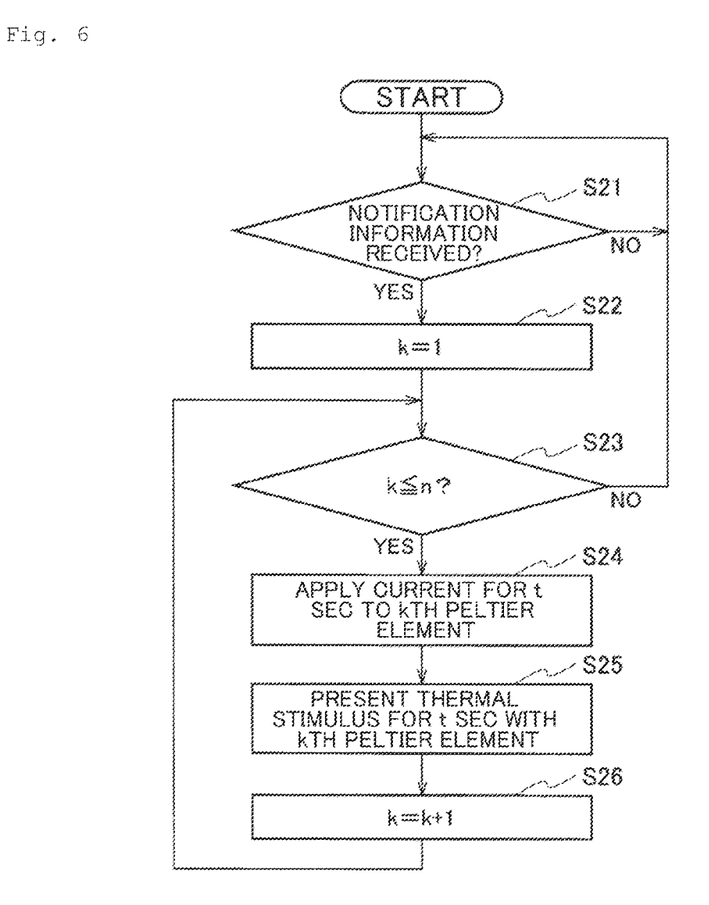
FIG. 6 is a flowchart showing operations of a dynamic presentation method by the thermal stimulus presentation device.

FIG. 6 is a flowchart showing operations of the dynamic presentation method by the thermal stimulus presentation device 1. Here, the number of Peltier elements 2 mounted in the mouth is n. The control unit 12 performs control to apply an electrical current sequentially from the first to nth Peltier elements 2. Note that numbers (IDs) from 1 to n are allocated to the Peltier elements 2 from the right side to the left side (or from the left side to the right side), based on the mounting position in the mouth.

The receiving unit 11 receives notification information for notifying the user from an external device (S21: YES). Upon the notification information being received, the control unit 12 sets a variable k to 1 (k=1) (S22), and, if k is less than or equal to n (S23: YES), applies an electrical current for t seconds (predetermined duration) to the kth Peltier element 2 (S24). Due to the electrical current being applied to the kth Peltier element 2, the copper plate of the p-n junction cools down or heats up, and a thermal stimulus is presented in the mouth by the kth Peltier element 2 (S25).

The control unit 12 then adds 1 to k (S26), and repeatedly performs the processing from S23 to S26 until k equals n. Each Peltier element 2 in the mouth cools down or heats up in accordance with the control (application of electrical current) of the control unit 12. As a result, the plurality of Peltier elements 2 in the mouth will cool down or heat up one after the other in a predetermined direction (from right to left, or from left to right). The user is thereby able to detect a direction.

(Testing)

Hereinafter, testing that verified whether the thermal stimulus presentation device 1 of the present embodiment is realizable as an intraoral tactile display with the configuration of the implementation example shown in FIG. 2 will be described.

[Test 1]

Test 1 was a test of the static presentation method. The testing method of this test was as follows. This test was performed for both a cold stimulus and a warm stimulus as the thermal stimulus.

1. The test subjects were eight men and women from their 20s to 50s.

2. Room temperature was 24° C.

3. Three Peltier elements were disposed in a row at 3 mm intervals, and the copper plate (p-n junction) of each Peltier element was brought in contact with the back side of the upper lip. The aforementioned small Peltier element was used for the Peltier elements. That is, single-element Peltier elements were used in which the dimensions of the ceramic substrate were 3.5×3.35 mm and the dimensions of the copper plate of the p-n junction were 2.8×1.1 mm.

In test 1, the Peltier elements disposed in a row were not mounted to the teeth but were held by hand at the position of the front teeth (vicinity of the center of the teeth), and were brought in contact with the back side of the upper lip. Note that a handle for holding the Peltier elements was connected thereto.

4. With regard to the cold stimulus, the electrical current value was raised successively starting from 100 mA by 100 mA each time, and the three Peltier elements were caused to present the cold stimulus simultaneously a plurality of times. The test subjects responded as to whether they felt that the temperature had changed (become colder), every time the cold stimulus was presented. The threshold of the electrical current at which the temperature change was felt was computed for every test subject with an up-down method (average value of four loopbacks).

5. With regard to the warm stimulus, the electrical current value was raised successively starting from 100 mA by 100 mA each time, with the direction of the current being opposite to the cold stimulus, and the three Peltier elements were caused to present the warm stimulus simultaneously a plurality of times. The test subjects responded as to whether they felt that the temperature had changed (become warmer), every time the warm stimulus was presented. The threshold of the electrical current at which the temperature change was felt was computed for every test subject with an up-down method (average value of four loopbacks).

6. The medians of the thresholds of the cold stimulus and the thresholds of the warm stimulus of all the test subjects were respectively calculated.

The test results were as follows. The median of the thresholds at which the cold stimulus was perceived was 160 mA (approx. 23.5° C.), and the median of the thresholds at which the warm stimulus was perceived was 560 mA (approx. 31° C.). From the test results, it can be said that a tactile display capable of intraoral information presentation can be realized by the thermal stimulus presentation device 1 of the present embodiment. That is, a tactile display can be realized, by a Peltier element array (plurality of Peltier elements) of several millimeters on all sides presenting thermal stimuli in the mouth. Also, with the thermal stimuli that are presented, the cold stimulus is arguably more suitable for information presentation than the warm stimulus, taking the medians of the thresholds into consideration.

[Test 2]

The test 2 was a test of the dynamic presentation method. The testing method of this test was as follows. This test was performed for both a cold stimulus and a warm stimulus as the thermal stimulus.

1. The test subjects were eight men and women from their 20s to 50s.

2. Room temperature was 24° C.

3. Three Peltier elements were disposed in a row at 3 mm intervals, and the copper plate (p-n junction) of each Peltier element was brought in contact with the back side of the upper lip. The same small Peltier element as test 1 was used for the Peltier elements. In test 2, the Peltier elements disposed in a row were not mounted to the teeth but were held by hand at the position of the front teeth (vicinity of the center of the teeth), and were brought in contact with the back side of the upper lip. Note that a handle for holding the Peltier elements was connected thereto.

4. With regard to the cold stimulus, presentation of the cold stimulus was dynamically performed a plurality of times while lengthening the stimulus presentation duration of each Peltier element starting from 100 ms by 100 ms each time. Presentation of the cold stimulus was performed until the test subjects were able to perceive the movement direction. The maximum stimulus presentation duration was 1000 ms.

The dynamic cold stimulus involved presenting one cold stimulus each starting from the Peltier elements on the right side and moving toward the Peltier elements on the left side. The electrical current value that was applied was 1000 mA and the stimulation interval was 0 second. That is, the end of application to the kth Peltier element and the start of application to the k+1th Peltier element were performed simultaneously.

Specifically, the first time, each Peltier element was caused to present the cold stimulus for a stimulus presentation duration of 100 ms successively starting from right side. The second time, each Peltier element was caused to present the cold stimulus for 200 ms successively starting from right side. Thereafter, the cold stimulus was presented at 100 ms longer each time until the test subjects were able to perceive the stimulus.

5. The test subjects responded as to whether they could perceive the movement direction, every time the cold stimulus was dynamically presented for each stimulus presentation duration (100 ms, 200 ms, 300 ms, . . . ). The threshold of the thermal stimulus presentation duration at which the movement direction was perceived for every test subject was computed by a method of limits (stimulus presentation duration at which the movement direction was first perceived).

6. The warm stimulus was presented in a similar manner to the cold stimulus. That is, presentation of the warm stimulus was dynamically performed a plurality of times while lengthening the stimulus presentation duration of each Peltier element starting from 100 ms by 100 ms each time. Presentation of the warm stimulus was performed until the test subjects were able to perceive the movement direction. The maximum stimulus presentation duration was 1000 ms. The dynamic warm stimulus involved presenting one warm stimulus each starting from the Peltier elements on the right side and moving toward the Peltier elements on the left side. The electrical current value that was applied was 1000 mA and the stimulation interval was 0 second.

7. The test subjects responded as to whether they could perceive the movement direction, every time the warm stimulus was dynamically presented for each stimulus presentation duration (100 ms, 200 ms, 300 ms, . . . ), similarly to the cold stimulus. The threshold of the thermal stimulus presentation duration at which the movement direction was perceived for every test subject was computed by a method of limits (stimulus presentation duration at which the movement direction was first perceived).

8. The medians of the thresholds of the cold stimulus and the thresholds of the warm stimulus of all the test subjects were respectively calculated.

The test results were as follows. The median of the thresholds at which the cold stimulus was perceived was 300 ms, and the median of the thresholds at which the warm stimulus was perceived was 700 ms. With the warm stimulus, however, four out of the eight test subjects were not able to perceive the movement direction. From the test results, it can be said that a tactile display capable of intraoral information presentation can be realized by the thermal stimulus presentation device 1 of the present embodiment. That is, a tactile display can be realized, by a Peltier element array (plurality of Peltier elements) of several millimeters on all sides presenting thermal stimuli in the mouth. Also, with the thermal stimuli that are presented, the cold stimulus is arguably able to allow direction to be perceived in a shorter time than the warm stimulus, taking the medians of the thresholds into consideration.

As described above, the thermal stimulus presentation device 1 of the present embodiment is provided with the presentation unit 13 that presents a thermal stimulus in the mouth, the receiving unit 11 that receives notification information for notifying the user, and the control unit 12 that controls the thermal stimulus of the presentation unit 13 upon the notification information being received, and the presentation unit 13 presents the thermal stimulus in the mouth in accordance with the control of the control unit 12.

In the present embodiment, a tactile display capable of intraoral information presentation without stressing the user can thereby be realized.

The presentation unit 13 of the present embodiment is provided with at least one Peltier element 2 (thermoelectric element), and the control unit 12 applies an electrical current to the Peltier element 2. With the present embodiment, the device that is mounted in the mouth can thereby be miniaturized.

In the present embodiment, the user is enabled to sensitively detect a thermal stimulus, due to the presentation unit 13 presenting a cold stimulus as the thermal stimulus. The following literature states that warm stimuli are difficult to feel in the case where the area for presenting the thermal stimulus is small, and the cold stimulus is arguably preferable as the thermal stimulus.

Lynette A. Jones and Hsin-Ni Ho, "Warm or cool, large or small? The challenge of thermal displays"

Note that the present invention is not limited to the above embodiment, and various modifications and combinations are possible within the technical concept of the present invention.

For example, in the above embodiment, the Peltier elements 2 (presentation unit 13) are mounted to the front side of the teeth and the thermal stimulus is presented to the lips, but the Peltier elements 2 may be mounted to the back side of the teeth, and the thermal stimulus may be presented to the tongue (tip of the tongue) which is sensitive to temperature similarly to the lips. That is, the Peltier elements 2 may be mounted to the front side of the teeth, the back side of the teeth, or both the front side and back side of the teeth.

Also, the control unit 12 of the above embodiment may control the thermal stimulus according to the type of notification information. For example, the control unit 12 may acquire a type of thermal stimulus (cold stimulus, warm stimulus) that depends on the type of notification information, and apply an electrical current to the Peltier elements 2 at an electrical current value (direction of electrical current) of the acquired thermal stimulus. Also, the control unit 12 may acquire a temperature (intensity of thermal stimulus) that depends on the type of notification information, and apply an electrical current to the Peltier elements 2 at an electrical current value (magnitude of electrical current) that will achieve the acquired temperature. Also, the control unit 12 may acquire a presentation method (static presentation method, dynamic presentation method) that depends on the type of notification information, and apply an electrical current to the Peltier elements 2 with the acquired presentation method. In this case, control information such as type of thermal stimulus (cold stimulus, warm stimulus), temperature of thermal stimulus and presentation method may be stored in advance, for every type of notification information, in the memory of the micon 3, for example, and the control unit 12 may control the thermal stimulus according to the type of notification information with reference to this control information.

Also, the thermal stimulus presentation device 1 of the present embodiment may be used for navigation use application, in combination with an inertial sensor that senses the direction of the head. For example, the user's position and the direction in which the user is facing are sensed using GPS and a 9-axis inertial sensor that combines acceleration, gyroscope and geomagnetic sensors, and a thermal stimulus is presented in the mouth in the direction of the destination using the thermal stimulus presentation device 1. Specifically, it is conceivable to install a 9-axis inertial sensor and use a smartphone capable of receiving GPS signals. The smartphone carried by the user transmits a navigation instruction (notification information) that is output by a map search app installed on the smartphone to the thermal stimulus presentation device 1. The thermal stimulus presentation device 1 presents a thermal stimulus in the mouth, according to the received navigation instruction. For example, in the case where the destination is on the left side of the user, the Peltier elements disposed on the left side of the mouth present a thermal stimulus, and, in the case where the destination is in the direction straight ahead, the Peltier elements disposed in the center of the mouth present a thermal stimulus. Also, in order to indicate the direction to the left side, a thermal stimulus may be presented dynamically starting from the Peltier elements on the right side and moving toward the Peltier elements on the left side.

REFERENCE SIGNS LIST

1 Thermal stimulus Presentation Device
11 Receiving unit
12 Control unit
13 Presentation unit
2 Peltier element
3 Micon
4 Power source
5 Lead

The invention claimed is:

1. A thermal stimulus presentation device comprising:
a presentation unit, implemented using one or more computing devices, configured to present a thermal stimulus within a mouth of a user;
a receiving unit including a circuit and configured to receive notification information that notified the user; and
a control unit, implemented using one or more computing devices, configured to, based on the notification information being received, control the thermal stimulus of the presentation unit,
wherein the presentation unit is configured to present the thermal stimulus within the mouth in accordance with the control of the control unit,
wherein the presentation unit includes a plurality of thermoelectric elements arranged along an axis, and
wherein controlling the thermal stimulus of the presentation unit comprises sequentially applying an electrical current to the plurality of thermoelectric elements along the axis, to thereby guide the user in a direction in which the electrical current is applied.

2. The thermal stimulus presentation device according to claim 1,
wherein the presentation unit is mounted to a front side of teeth, a back side of teeth, or both the front side and back side of teeth.

3. The thermal stimulus presentation device according to claim 1, wherein each of the plurality of thermoelectric elements includes a ceramic substrate and a copper plate.

4. The thermal stimulus presentation device according to claim 3, wherein presenting the thermal stimulus comprises adjusting a temperature of the copper plate based on the applied electrical current.

5. The thermal stimulus presentation device according to claim 1, wherein the notification information is received from an external device.

6. The thermal stimulus presentation device according to claim 1, wherein the notification information indicates the direction for guiding the user.

7. The thermal stimulus presentation device according to claim 1, wherein the electrical current is applied for a predetermined duration.

8. A thermal stimulus presentation method that is performed by a thermal stimulus presentation device, the method comprising:
receiving notification information that notifies a user;
controlling a thermal stimulus to be presented in a mouth of the user, based on the notification information being received; and
presenting, through a plurality of thermoelectric elements arranged along an axis, the controlled thermal stimulus in the mouth,
wherein controlling the thermal stimulus comprises sequentially applying an electrical current to the plurality of thermoelectric elements along the axis, to thereby guide the user in a direction in which the electrical current is applied.

9. The thermal stimulus presentation method according to claim 8, wherein each of the plurality of thermoelectric elements includes a ceramic substrate and a copper plate.

10. The thermal stimulus presentation method according to claim 9, wherein presenting the controlled thermal stimulus comprises adjusting a temperature of the copper plate based on the applied electrical current.

11. The thermal stimulus presentation method according to claim 8, wherein the notification information is received from an external device.

12. The thermal stimulus presentation method according to claim 8, wherein the notification information indicates the direction for guiding the user.

13. The thermal stimulus presentation method according to claim 8, wherein the electrical current is applied for a predetermined duration.

* * * * *